(12) United States Patent
Deng et al.

(10) Patent No.: US 11,294,712 B2
(45) Date of Patent: Apr. 5, 2022

(54) METHOD, DEVICE AND COMPUTER PROGRAM PRODUCT FOR TASK MANAGEMENT

(71) Applicant: EMC IP Holding Company LLC, Hopkinton, MA (US)

(72) Inventors: Binbin Deng, Shanghai (CN); Tianfang Xiong, Shanghai (CN); Mancheng Xiong, Shanghai (CN); Shaocong Liang, Shanghai (CN); Zhipeng Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 349 days.

(21) Appl. No.: 16/381,149

(22) Filed: Apr. 11, 2019

(65) Prior Publication Data

US 2019/0384631 A1 Dec. 19, 2019

(30) Foreign Application Priority Data

Jun. 15, 2018 (CN) .......................... 201810623341.2

(51) Int. Cl.
*G06F 9/46* (2006.01)
*G06F 9/48* (2006.01)

(52) U.S. Cl.
CPC ............ *G06F 9/485* (2013.01); *G06F 9/4812* (2013.01); *G06F 9/4881* (2013.01); *G06F 2209/482* (2013.01)

(58) Field of Classification Search
CPC ....... G06F 9/485; G06F 9/4812; G06F 9/4881
See application file for complete search history.

(56) References Cited

U.S. PATENT DOCUMENTS

| | | | |
|---|---|---|---|
| 7,146,387 B1 | 12/2006 | Russo et al. | |
| 9,201,887 B1 | 12/2015 | Earl et al. | |
| 10,331,525 B2 | 6/2019 | Earl et al. | |
| 10,417,027 B1 | 9/2019 | Earl et al. | |
| 10,733,165 B1* | 8/2020 | Broad | G06F 16/2246 |
| 10,812,341 B1 | 10/2020 | Campello De Souza et al. | |
| 10,860,438 B1 | 12/2020 | Reddy A V et al. | |
| 10,860,622 B1 | 12/2020 | Florissi | |
| 10,942,820 B2 | 3/2021 | Reddy A V et al. | |
| 10,983,953 B2 | 4/2021 | Rajawat et al. | |
| 2007/0226743 A1* | 9/2007 | Takahashi | G06F 9/5066 718/104 |

* cited by examiner

*Primary Examiner* — Tammy E Lee
(74) *Attorney, Agent, or Firm* — BainwoodHuang

(57) ABSTRACT

Task management techniques, in a storage system, involve: dividing a task to be processed into a plurality of child tasks, so that a processing time required by each of the plurality of child tasks is same, the number of the plurality of child tasks being a first number; dividing a progress to be reported and being associated with the processing of the task into a plurality of child progresses, the number of the plurality of the child progresses being a second number, the second number being less than the first number, and each of the plurality of child progresses having a same value; and associating, based on the first and the second number, and according to a predetermined mapping between the plurality of child progresses and the plurality of child tasks, each of the plurality of child progresses with a respective child task of the plurality of child tasks.

22 Claims, 4 Drawing Sheets

METHOD, DEVICE AND COMPUTER PROGRAM PRODUCT FOR TASK MANAGEMENT

CROSS-REFERENCE TO RELATED APPLICATION(S)

This application claims priority to Chinese Patent Application No. CN201810623341.2, on file at the China National Intellectual Property Administration (CNIPA), having a filing date of Jun. 15, 2018, and having "METHOD, DEVICE, AND COMPUTER PROGRAM PRODUCT FOR TASK MANAGEMENT" as a title, the contents and teachings of which are herein incorporated by reference in their entirety.

FIELD

Embodiments of the present disclosure generally relate to storage systems, and more specifically, to method, device and computer program product for task management in a storage system.

BACKGROUND

A "job" is a worker thread to carry on the working content and reports its progress percentage as the working content is processed, so that users have some basic idea about how the job is going on. The job progress percentage is maintained at the integer precision level since the first day when some storage products were launched.

In a group operations which are packed to run in a job, it may contain a number of child tasks which are then scheduled to execute in separated threads and served by a thread pool. It is noteworthy that the weight (or time spent) for each child task can be assumed equal and the total job progress can be an approximate value. It is intended to increase the group operation's job progress when each child task is completed. The total available job progress percentage (usually 100%) is evenly distributed among or assigned to all child tasks by dividing 100 with task numbers before scheduling the threads to execute them, so that each child task knows in advance how many percentages to increase when it is completed.

SUMMARY

Various embodiments of the present disclosure provide a method, device and computer program product for task management.

According to a first aspect of the present disclosure, there is provided a method for task management. The method includes: dividing a task to be processed into a plurality of child tasks, so that a processing time required by each of the plurality of child tasks is the same, the number of the plurality of child tasks being a first number; dividing a progress to be reported and being associated with the processing of the task into a plurality of child progresses, the number of the plurality of the child progresses being a second number, the second number being less than the first number, and each of the plurality of child progresses having a same value; and associating, based on the first number and the second number and according to a predefined mapping relationship between the plurality of child progresses and the plurality of child tasks, each of the plurality of child progresses with a respective child task of the plurality of child tasks.

According to a second aspect of the present disclosure, there is provided a device for task management. The device includes: a processing unit; and a memory coupled to the processing unit and having instructions stored thereon, the instructions, when executed by the processing unit, performing acts including: dividing a task to be processed into a plurality of child tasks, so that a processing time required by each of the plurality of child tasks is the same, the number of the plurality of child tasks being a first number; dividing a progress to be reported and being associated with the processing of the task into a plurality of child progresses, the number of the plurality of the child progresses being a second number, the second number being less than the first number, and each of the plurality of child progresses having a same value; and associating, based on the first number and the second number and according to a predefined mapping relationship between the plurality of child progresses and the plurality of child tasks, each of the plurality of child progresses with a respective child task of the plurality of child tasks.

According to a third aspect of the present disclosure, there is provided a computer program product for task management. The computer program product is tangibly stored on a non-transient computer readable medium and includes machine executable instructions which, when executed, cause the machine to implement steps of a method according to the first aspect.

BRIEF DESCRIPTION OF THE DRAWINGS

The accompanying drawings described in this text are provided here to further explain the present disclosure and constitute one part of the present disclosure. Example embodiments of the present disclosure and their description are for explaining the present disclosure rather than improperly limiting the present disclosure.

The same or similar reference numerals represent the same or similar elements throughout the figures.

DETAILED DESCRIPTION OF EMBODIMENTS

Figure 1:
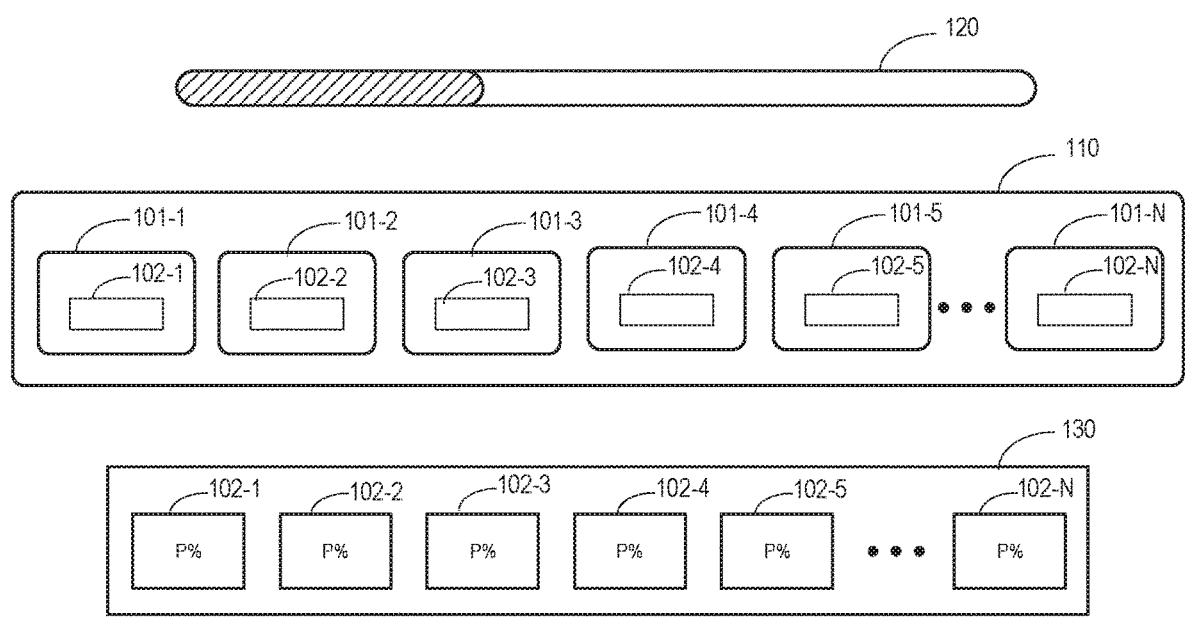
FIG. 1 schematically shows a task management system.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of the present disclosure are now described with reference to several example embodiments shown in the drawings. Although example embodiments of the present disclosure are illustrated in the drawings, it should be understood that embodiments are described to enable those skilled in the art to better understand and implement the present disclosure, rather than limiting the scope of the present disclosure in any manner.

As used herein, the term "includes" and its variants are to be read as open-ended terms that mean "includes, but is not limited to." The term "based on" is to be read as "based at least in part on." The term "one embodiment" is to be read as "at least one example embodiment." The term "a further embodiment" is to be read as "at least one embodiment." The term "another embodiment" is to be read as "at least one other embodiment." The terms "first", "second" and so on can refer to same or different objects. The following text also can include other explicit and implicit definitions.

In some existing storage systems, the job progress percentage is maintained at integer precision level. Typically, when the number of tasks is less than the total progress (usually 100), the available job progress percentage can be evenly distributed to all child tasks by dividing 100 with the number of tasks, so that each child task knows in advance how many percentages to increase as it is completed.

However, when the number of tasks exceeds the total progress (e.g. 100), each child task will be allocated with zero progress percentage (as the result of the integer division), which would cause the total progress not to increase when each child task is completed. As a result, users may have no idea about the current progress of the child tasks, which will worsen user experience.

A possible improved solution is to change existing job progress percentage's precision level from integer type to floating point type so as to display accurate progress. However, in some storage systems, a job progress percentage model has been designed and implemented since the first day, and has been widely used across all functional areas, technical stacks and product releases. Therefore, if the existing job progress percentage's precision level is changed from integer type to floating point type, it would cause significant changes. Also floating point type has its own drawbacks, such as degraded performance, potential lack of platform support, extra formatting for displaying, and so on.

FIG. 1 schematically shows a task management system according to an embodiment of the present disclosure. As shown, the system includes a thread pool 110 consisting of a plurality of threads 101-1, 101-2, 101-3, 101-4, 101-5, . . . , 101-N, where each thread is used for processing one specific child task 102-1, 102-2, 102-3, 102-4, 102-5, . . . , 102-N respectively.

As further illustrated in FIG. 1, the system further includes a progress bar 120, which is used for reporting the progress percentages as the above child tasks are being processed, so that users may have some basic idea about how the job is going on. In this text, the weight (time required for processing) of each child task can be assumed to be equal. The total job progress can be an approximate value. It is intended to increase the group operation's job progress as each child task is completed. Usually the total job progress percentage is set to 100%. In addition, FIG. 1 further shows a mapping table 130, which may determine in advance a percentage by which the progress bar 120 will increase after each child task is completed.

Traditionally, as shown in FIG. 1, when the number of child tasks is less than the total progress percentage (e.g. 100%), after each child task is completed, the whole job progress percentage will increase by P %, where the value of P is equal to a result of dividing 100 by the number of child tasks. For example, when there are 20 child tasks, after each child task is completed, the whole job progress percentage will increase by 5%.

However, as described above, when the number of child tasks exceeds 100, due to the integer type division, each child task will be allocated with zero progress percentage, which causes the total progress not to increase upon each child task is completed. This means users have no idea about the current processing progress of child tasks, which will worsen user experience.

To this end, embodiments of the present disclosure propose a new scheme for task management. According to the solution described in various embodiments of the present disclosure, the existing job progress percentage's precision level does not need to be changed from integer type to floating point type. In the meantime, a job progress display that is very close to the floating point type (but still based on the integer type) can be provided to users. This ensures good user experience.

Basic principles and several example embodiments of the present disclosure will be illustrated with reference to FIGS. 2 to 4. It is to be appreciated that these example embodiments are provided only to enable those skilled in the art to better understand and implement embodiments of the present disclosure, rather than limiting the scope of the present disclosure.

Figure 2:
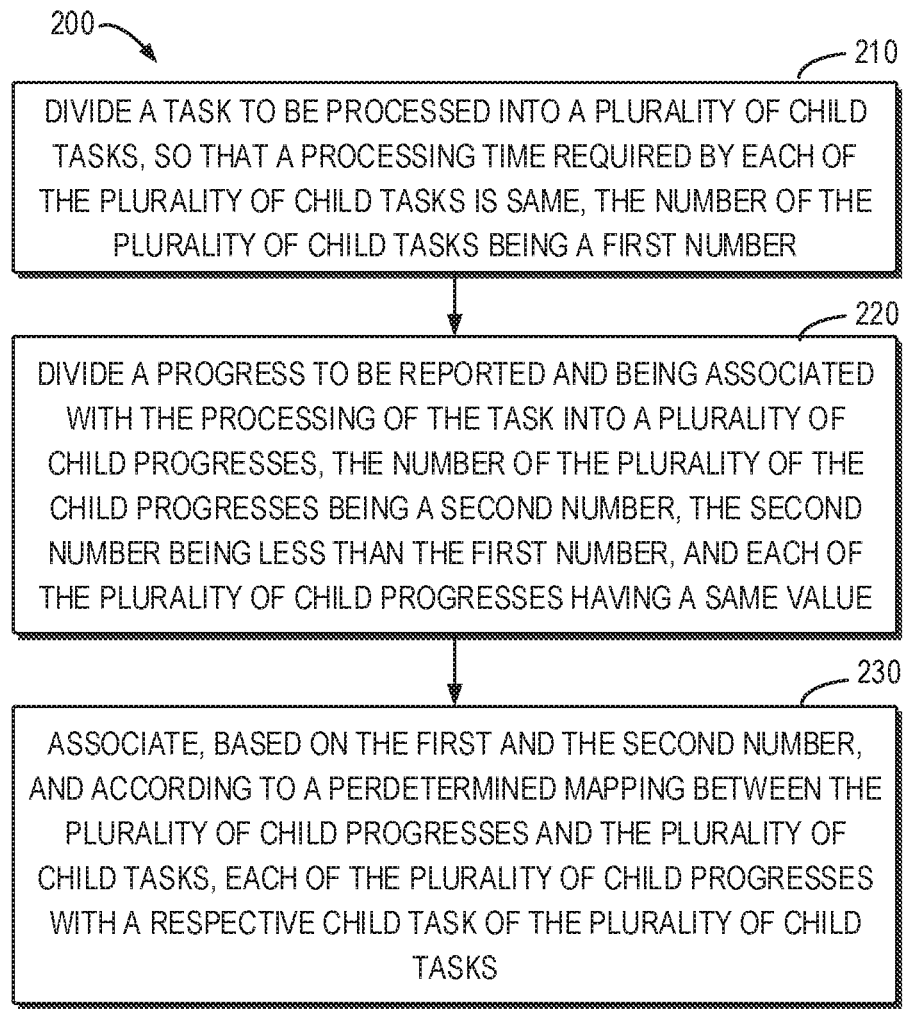
FIG. 2 shows a flowchart of a method of task management according to an embodiment of the present disclosure.

FIG. 2 shows a flowchart of a task management method 200 according to an embodiment of the present disclosure. The description below will be first provided with reference to the task management system as shown in FIG. 1.

At 210, a task to be processed is divided into a first number of plurality of child tasks 102-1, 102-2, . . . , 102-N so that the processing time for each child task is the same. For example, such child tasks may be data copies generated for a plurality of file systems. In this text, the first number is denoted as "N" for the ease of discussion.

At 220, a progress to be reported that is associated with the processing of the task is divided into a second number of plurality of child progresses, wherein the second number is less than the first number, and each child progress among the plurality of child progresses has the same value. In this text, the second number is denoted as "M" for the ease of discussion.

To solve the issue caused by the second number being less than the first number (i.e. M<N), that the integer type-based total progress percentage does not increase upon each child task is completed, at 230, each child progress among the plurality of child progress (M child progress) is associated with a respective child task among the plurality of child tasks (N child tasks) based on the first number of child tasks and the second number of child progress and according to a predefined mapping relationship between a child progress and a child task. It is to be noted that since M<N, not every child task will be assigned with one child progress. That is, not every child task's completion will cause the total progress percentage to be increased by one child progress.

In some embodiments, the method 200 may further include reporting the progress in association with the processing of the task. In some embodiments, during the progress reporting, when the processing of a respective child task that is associated with a child progress is completed, the reported progress will be increased by one child progress, while when the processing of a child task that is not associated with any child progress is completed, the reported progress will be maintained or unchanged.

That is, for the child task that is assigned with a progress percentage, upon it is completed, the total job progress percentage will be increased by a progress percentage, while for the child task that is not assigned with a child progress, after it is completed, the total job progress percentage will not be increased.

Figure 3:
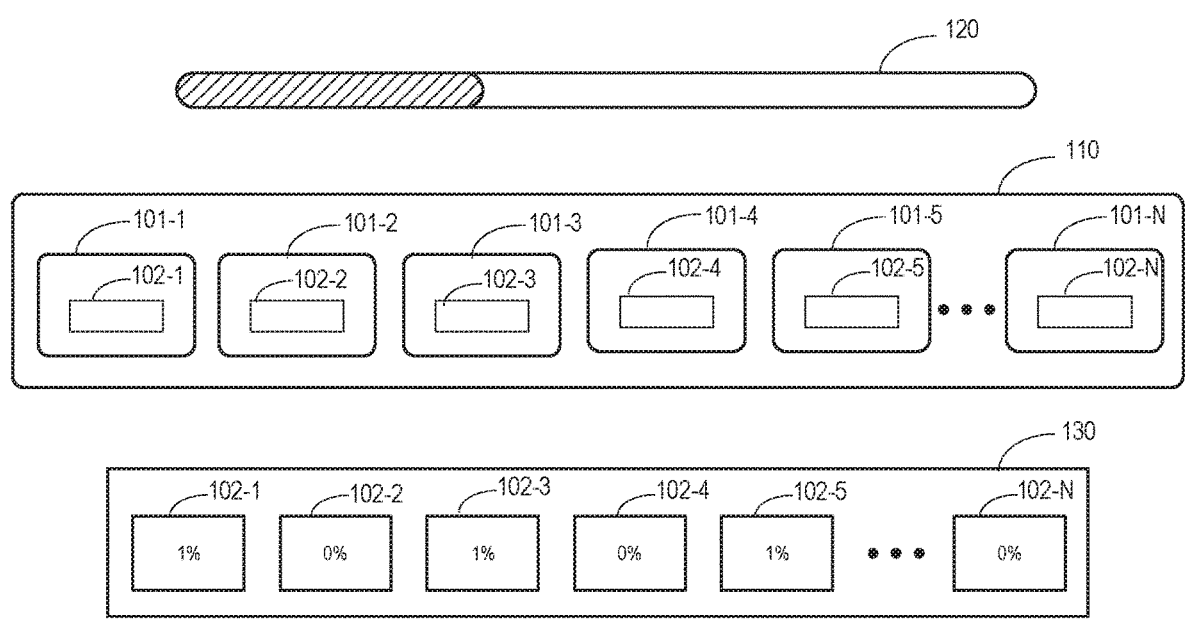
FIG. 3 shows a schematic view of progress reporting where the number of child tasks exceeds the total progress number, according to an embodiment of the present disclosure.

FIG. 3 shows a schematic view of progress report according to an embodiment of the present disclosure. As shown in FIG. 3 (and unlike FIG. 1), when the number of child tasks is larger than the total progress number, only part of child tasks can be assigned with a child progress (e.g. the child tasks 102-1, 102-2, 102-5, etc.), while the child tasks 102-2, 102-4 and so on will not be assigned with any child progress, or will only be assigned with 0% child progress. As such, only for those child tasks assigned with child progress, after their completions, the total progress will be increased by a child progress percentage.

In other words, the solution provided by the present disclosure is a solution based on integer type progress percentage (rather than, floating point type progress percentage). Hence, not only there is no need to significantly change the integer type based display precision that has been widely used in existing storage systems, but also, this integer type progress percentage-based solution still allows users to feel that the job is being normally proceeded with the completion of child tasks. In other words, from the user experience perspective, the solution described in the present disclosure can provide users with a job progress displayed in a way that is quite similar to floating point type (but still integer type) job progress display, by properly designing a mapping relationship between child progress and child tasks.

In some embodiments, the plurality of child progresses may include a first set of child progresses and a second set of child progresses, and the plurality of child tasks may include a first set of child tasks and a second set of child tasks. Thus at 230, each child progress in the first set of child progresses may be associated with a respective child task among plurality of child tasks whose indexes are increased by a first value, in the first set of child tasks, and each child progress in the second set of child progresses may be associated with a respective child task among plurality of child tasks whose indexes are increased by a second value, in the second set of child tasks. The second value is different from the first value.

In some embodiments, the first value may be set to be one. That is, each child progress in the first set of child progress may be associated with a respective child task among plurality of child tasks whose indexes are successively (i.e. continually) increased by 1, in the first set of child tasks. In some embodiments, the second value may be set to be larger than the first value by one.

In one specific example (also referred to as "Example I" below), assume there are 147 child tasks (i.e. N=147) to be processed, while there are only 100 available child progresses (i.e. M=100). At this point, the 147 child tasks may be divided into a first set of child tasks {0, 1, 2, . . . , 50, 51} and a second set of child progress {53, 55, 57, . . . , 143, 145}. In the first set of child tasks, each child task (i.e. the first value is one) will be allocated with one progress percentage, whereas in the second set of child tasks, every two child tasks (i.e. the second value is two) will be allocated with one percentage. Thereby, after each child task in the first set of child tasks is completed, the total progress will be increased by 1%, while after every two child tasks in the second set of child tasks are completed, the total progress will be increased by 1%. In this manner, it ensures that all child progresses can be as "evenly" distributed among selected child tasks as possible, which in turn minimizes at best effort the user experience sacrifice.

Similarly, in another specific example (also referred to as "Example II" below), assume there are 247 child tasks (i.e. N=247) to be processed, while there are, likewise, only 100 available child progress (i.e. M=100). In this case, the 247 child tasks may be divided into a first set of child tasks {0, 2, 4, . . . , 98, 100} and a second set of child progress {103, 106, 109, . . . , 241, 244}. In the first set of child tasks, every two child tasks (i.e. the first value is two) will be allocated with one progress percentage, whereas in the second set of child tasks, every three child tasks (i.e. the second value is three) will be allocated with one percentage.

Thereby, after every two child tasks in the first set of child tasks are completed, the total progress will be increased by 1%, while after every three child tasks in the second set of child tasks are completed, the total progress will be increased by 1%. In this manner, it ensures all child progresses can be as "evenly" distributed among selected child tasks as possible, which in turn minimizes at best effort the user experience sacrifice.

Note that the so-called "even" distribution of child progress among child tasks may further be implemented in other manners. In addition, other mapping relationship between child progresses and child tasks may be set depending on user experience.

For example, in some embodiments, the association of each child progress with a respective task may be set based on an integer quotient and remainder from a division of the first number by the second number, i.e., values of N/M and N % M, wherein the operator "/" represents integer division operation, and the operator "%" represents remainder operation (or modulo operation).

This provides an "analytical" method to implement the distribution of child progresses among the child tasks. Compared with a "numerical" method, the "analytical" method increases the computation efficiency. In addition, by means of the "analytical" method, factors that play decisive roles in distributing child progresses among child tasks may be observed directly.

In some other embodiments, the second number may be first adjusted by using a first predefined offset. Next, the association of each child progress with the respective child task may be set based on an integer quotient and a remainder from a division of the first number by the adjusted second number. For example, such association may be set based on N/(M−1) and N % (M−1). By reserving one percentage, a scenario in which when there are still child tasks being executed but the total progress percentage has already reached 100% can be avoided.

In some other embodiments, each child progress has a child progress index, and each child task has a child task index. In this case, each child progress may be associated with the respective child task by:

(1) determining an integer quotient from a division of the first number by the adjusted second number;

(2) determining a remainder from a division of the first number by the adjusted second number;

(3) for each child progress, updating the remainder with a second offset; and (4) determining a task index of the respective child task, by using the sum of the updated remainder and a product of the child progress index with the integer quotient.

The above method steps (1)-(5) may be implemented by the following pseudo codes:

```
int quotient = N / (M - 1)
int remainder = N % (M - 1)
for (int i = (M - 1); i>0; i--)
{
    int indexToAllocatePercentage = i * quotient + ( --remainder > 0 ? remainder: 0);
    taskIndexWithPercentageAllocatedpush_back(indexToAllocatePercentage)
    ;
}
``` wherein, "int" represents an integer; "i" represents the $i^{th}$ child progress; "quotient" represents an integer quotient from the division of the first number by the adjusted second number; "remainder" represents a remainder from a division of the first number and the adjusted second number; and "indexToAllocatePercentage" represents a task index of a respective child task to which a child progress will be allocated, which may be further obtained from the following equation:

$$indexToAllocatePercentage=i*quotient+(--remainder>0?remainder:0)$$

In the equation, the item "(--remainder>0 ? remainder: 0)" indicates that for each child progress, the remainder between the first number and the adjusted second number is first updated with a second offset, in this example, the second offset is set to "−1," i.e. the remainder between the first number and the adjusted second number is first decreased by 1 in each cycle. Next, it is determined whether the updated remainder (in this example, a remainder decreased by 1) is larger than zero. If yes, then the updated remainder value will be used as a result of the item "(--remainder>0 ? remainder: 0)", or else, zero will be used as the result of the item. Subsequently, the task index of the respective child task is determined using the updated remainder plus the product of the child progress index with the integer quotient. Finally, the task index of the respective child task to which the child progress is allocated is recorded with the function "taskIndexWithPercentageAllocated.push_back(indexToAllocatePercentage)".

Now with reference to the above described "Example I" again, assume there are 147 child tasks to be processed, after reserving one progress percentage, total 99 progress percentage will be allocated to the 147 child tasks.

In this manner, the following mapping of child progresses to child tasks may be obtained. That is, each of the plurality of successive child tasks {0, 1, 2, . . . , 50, 51} with child task indexes 0 through 51 will be allocated with one percentage, whereas one of every two child tasks among child tasks {53, 55, 57, . . . , 143, 145} with child task indexes 53 through 145 will be allocated with one percentage.

Also, with reference to the above described "Example II" again, assume there are 247 child tasks to be processed, after reserving one progress percentage, total 99 progress percentage will be allocated to the 247 child tasks.

In this manner, the following mapping of child progress to child tasks may be obtained. That is, one of every two child tasks among child tasks with child task indexes 0 through 100 (that is, {0, 2, 4, . . . , 98, 100}) will be allocated with one percentage, whereas one of every three child tasks among child tasks with child task indexes 103 through 244 (that is, {103, 106, 109, . . . , 241, 244}) will be allocated with one percentage.

It can be found that for both "Example I" and "Example II", the above algorithm can achieve "even" distribution of the same child progress to child tasks. However, the difference lies in that the algorithm provides an "analytical" method to achieve the "even" distribution. As such, not only factors that play decisive roles in distributing child progresses among child tasks may be observed directly, but also users may adaptively adjust such "even" distribution by adjusting a weight for each item in the algorithm.

Figure 4:
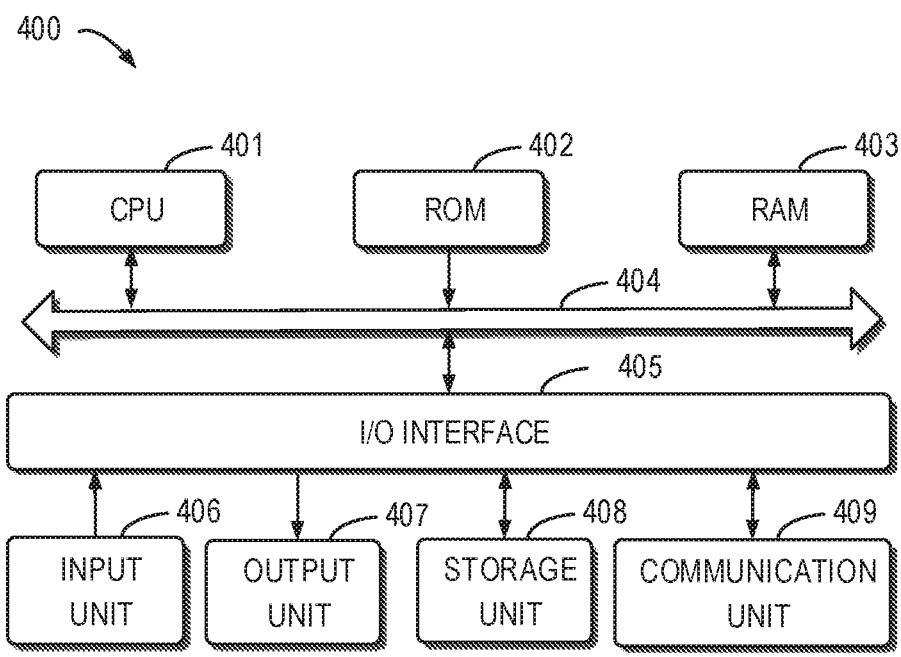
FIG. 4 shows a schematic block diagram of a device which is applicable to implement embodiments of the present disclosure.

FIG. 4 schematically shows a block diagram of a device 400 which is applicable to implement embodiments of the present disclosure. As depicted, the device 400 includes a central process unit (CPU) 401, which can execute various suitable actions and processing based on the computer program instructions stored in the read-only memory (ROM) 402 or computer program instructions loaded in the random-access memory (RAM) 403 from a storage unit 408. The RAM 403 can also store all kinds of programs and data required by the operations of the device 400. CPU 4901, ROM 402 and RAM 403 are connected to each other via a bus 404. The input/output (I/O) interface 405 is also connected to the bus 404.

A plurality of components in the device 400 is connected to the I/O interface 405, including: an input unit 406, such as keyboard, mouse and the like; an output unit 407, e.g., various kinds of display and loudspeakers etc.; a storage unit 408, such as magnetic disk and optical disk etc.; and a communication unit 409, such as network card, modem, wireless transceiver and the like. The communication unit 409 allows the device 400 to exchange information/data with other devices via the computer network, such as Internet, and/or various telecommunication networks.

The above described each process and treatment, such as the method 200, can also be executed by the processing unit 401. For example, in some embodiments, the method 200 can be implemented as a computer software program tangibly included in the machine-readable medium, e.g., the storage unit 408. In some embodiments, the computer program can be partially or fully loaded and/or mounted to the device 400 via ROM 402 and/or the communication unit 409. When the computer program is loaded to the RAM 403 and executed by the CPU 401, one or more steps of the above described method 200 can be implemented. Alternatively, in other embodiments, the CPU 401 also can be configured in other suitable manners to realize the above procedure/method.

It should be understood the above detailed embodiments of the present disclosure are only for illustrating or explaining principles of the present disclosure, rather than limiting the present disclosure. Therefore, any modifications, equivalent replacements and improvements should be included in the scope of the protection scope of the present disclosure without departing from the spirit and scope of the present disclosure.

We claim:

1. A method of task management, the method comprising:
dividing a task to be processed within a set of worker threads running on a storage system into a plurality of child tasks, so that a processing time required by each of the plurality of child tasks is same, the number of the plurality of child tasks being a first number;
dividing a progress to be reported and being associated with a processing of the task into a plurality of child progresses, the number of the plurality of the child progresses being a second number, the second number being less than the first number, and each of the plurality of child progresses having a same value; and associating, based on indexing using the first number and the second number as integers, and according to a predetermined mapping between the plurality of child progresses and the plurality of child tasks, each of the plurality of child progresses with a respective child task of the plurality of child tasks such that displayable progress for the task is provided as the child tasks complete within the storage system;

wherein associating each of the plurality of child progresses with the respective child task comprises:

associating, based on an integer quotient and a remainder from a division of the first number by the second number, each of the plurality of child progresses with the respective child task.

2. The method of claim 1, wherein the plurality of child progress comprise a first and a second set of child progresses, and the plurality of child tasks comprise a first and a second set of child tasks.

3. A method of task management, the method comprising:

dividing a task to be processed within a set of worker threads running on a storage system into a plurality of child tasks, so that a processing time required by each of the plurality of child tasks is same, the number of the plurality of child tasks being a first number;

dividing a progress to be reported and being associated with a processing of the task into a plurality of child progresses, the number of the plurality of the child progresses being a second number, the second number being less than the first number, and each of the plurality of child progresses having a same value; and associating, based on indexing using the first number and the second number as integers, and according to a predetermined mapping between the plurality of child progresses and the plurality of child tasks, each of the plurality of child progresses with a respective child task of the plurality of child tasks such that displayable progress for the task is provided as the child tasks complete within the storage system;

wherein the plurality of child progress comprise a first and a second set of child progresses, and the plurality of child tasks comprise a first and a second set of child tasks; and wherein associating each of the plurality of child progresses with the respective child task comprises:

indexing the first set of child tasks and the second set of child tasks into an order;

in accordance with the order, associating each child progress of the first set of child progresses with a respective $X^{th}$ child task of the plurality of child tasks in which X is a first value; and in accordance with the order, associating each child progress of the second set of child progresses with a respective $Y^{th}$ child task of the plurality of child tasks in which Y is a second value, and wherein the second value is different from the first value.

4. The method of claim 3, wherein the first value is one.

5. The method of claim 3, wherein the second value exceeds the first value by one.

6. A method of task management, the method comprising:

dividing a task to be processed within a set of worker threads running on a storage system into a plurality of child tasks, so that a processing time required by each of the plurality of child tasks is same, the number of the plurality of child tasks being a first number;

dividing a progress to be reported and being associated with a processing of the task into a plurality of child progresses, the number of the plurality of the child progresses being a second number, the second number being less than the first number, and each of the plurality of child progresses having a same value; and associating, based on indexing using the first number and the second number as integers, and according to a predetermined mapping between the plurality of child progresses and the plurality of child tasks, each of the plurality of child progresses with a respective child task of the plurality of child tasks such that displayable progress for the task is provided as the child tasks complete within the storage system;

wherein the plurality of child progress comprise a first and a second set of child progresses, and the plurality of child tasks comprise a first and a second set of child tasks; and wherein associating each of the plurality of child progresses with the respective child task comprises:

adjusting the second number with a predefined first offset; and associating, based on an integer quotient and remainder from a division of the first number by the adjusted second number, each of the plurality of child progresses with the respective child task.

7. The method of claim 6, wherein each of the plurality of child progresses has a child progress index, and each of the plurality of child tasks has a child task index, and wherein associating each of the plurality of child progresses with the respective child task comprises:

determining the integer quotient from the division of the first number by the adjusted second number, determining the remainder from the division of the first number by the adjusted second number, for each of the plurality of child progresses, updating the remainder with a second offset, and determining a task index of the respective child task by using a sum of the updated remainder and a product of the child progress index with the integer quotient.

8. The method of claim 1, further comprising:

reporting the progress in association with the processing of the task.

9. The method of claim 8, wherein reporting the progress comprises:

increasing the reported progress by one child progress, in response to completion of the processing of the respective child task associated with each child progress.

10. The method of claim 9, wherein reporting the progress further comprises:

maintaining the reported progress unchanged, in response to completion of a processing of a child task that is not associated with any child progress.

11. A device of task management, comprising:

a processing unit; and a memory coupled to the processing unit and having instructions stored thereon, the instructions, when executed by the processing unit, performing acts comprising:

dividing a task to be processed within a set of worker threads running on a storage system into a plurality of child tasks, so that a processing time required by each of the plurality of child tasks is same, the number of the plurality of child tasks being a first number, dividing a progress to be reported and being associated with the processing of the task into a plurality of child progresses, the number of the plurality of the child progresses being a second number, the second number being less than the first number, and each of the plurality of child progresses having a same value, and associating, based on indexing using the first number and the second number as integers, and according to a predefined mapping relationship between the plurality of child progresses and the plurality of child tasks, each of the plurality of child progresses with a respective child task of the plurality of child tasks such that displayable progress for the task is provided as the child tasks complete within the storage system;

wherein the plurality of child progress comprise a first set of child progresses and a second set of child progresses, and the plurality of child tasks comprise a first set of child tasks and a second set of child tasks; and wherein associating each of the plurality of child progresses with the respective child task comprises:

indexing the first set of child tasks and the second set of child tasks into an order;

in accordance with the order, associating each child progress of the first set of child progresses with a respective $X^{th}$ child task of the plurality of child tasks in which X is a first value; and in accordance with the order, associating each child progress of the second set of child progresses with a respective $Y^{th}$ child task of the plurality of child tasks in which Y is a second value, and wherein the second value is different from the first value.

12. The device of claim 11, wherein the first value is one.

13. The device of claim 11, wherein the second value exceeds the first value by one.

14. The device of claim 11, wherein the acts further comprise:

reporting the progress in association with the processing of the task.

15. The device of claim 14, wherein reporting the progress comprises:

increasing the reported progress by one child progress, in response to completion of the processing of the respective child task associated with each child progress.

16. The device of claim 15, wherein reporting the progress further comprises:

maintaining the reported progress unchanged in response to completion of a processing of a child task that is not associated with any child progress.

17. A computer program product having a non-transitory computer readable medium which stores a set of instructions to perform task management; the set of instructions, when carried out by computerized circuitry, causing the computerized circuitry to perform a method of:

dividing a task to be processed within a set of worker threads running on a storage system into a plurality of child tasks, so that a processing time required by each of the plurality of child tasks is same, the number of the plurality of child tasks being a first number;

dividing a progress to be reported and being associated with a processing of the task into a plurality of child progresses, the number of the plurality of the child progresses being a second number, the second number being less than the first number, and each of the plurality of child progresses having a same value; and associating, based on indexing using the first number and the second number as integers, and according to a predetermined mapping between the plurality of child progresses and the plurality of child tasks, each of the plurality of child progresses with a respective child task of the plurality of child tasks such that displayable progress for the task is provided as the child tasks complete within the storage system;

wherein the plurality of child progress comprise a first set of child progresses and a second set of child progresses, and the plurality of child tasks comprise a first set of child tasks and a second set of child tasks; and wherein associating each of the plurality of child progresses with the respective child task comprises:

indexing the first set of child tasks and the second set of child tasks into an order;

in accordance with the order, associating each child progress of the first set of child progresses with a respective $X^{th}$ child task of the plurality of child tasks in which X is a first value; and in accordance with the order, associating each child progress of the second set of child progresses with a respective $Y^{th}$ child task of the plurality of child tasks in which Y is a second value, and wherein the second value is different from the first value.

18. The computer program product of claim 17, wherein the first value is one.

19. The computer program product of claim 17, wherein the second value exceeds the first value by one.

20. The computer program product of claim 17, further comprising:

reporting the progress in association with the processing of the task.

21. The computer program product of claim 20, wherein reporting the progress comprises:

increasing the reported progress by one child progress, in response to completion of the processing of the respective child task associated with each child progress.

22. The computer program product of claim 21, wherein reporting the progress further comprises:

maintaining the reported progress unchanged, in response to completion of a processing of a child task that is not associated with any child progress.

* * * * *